United States Patent
Fujigaki

(10) Patent No.: US 9,746,671 B2
(45) Date of Patent: Aug. 29, 2017

(54) HEAD MOUNTED DISPLAY APPARATUS, INFORMATION TERMINAL, AND METHODS AND INFORMATION STORAGE DEVICES FOR CONTROLLING HEAD MOUNTED DISPLAY APPARATUS AND INFORMATION TERMINAL

(71) Applicant: OLYMPUS CORPORATION, Tokyo (JP)

(72) Inventor: Hayato Fujigaki, Akishima (JP)

(73) Assignee: OLYMPUS CORPORATION, Tokyo (JP)

( * ) Notice: Subject to any disclaimer, the term of this patent is extended or adjusted under 35 U.S.C. 154(b) by 104 days.

(21) Appl. No.: 14/262,031

(22) Filed: Apr. 25, 2014

(65) Prior Publication Data

US 2014/0232620 A1 Aug. 21, 2014

Related U.S. Application Data

(63) Continuation of application No. PCT/JP2012/077283, filed on Oct. 23, 2012.

(30) Foreign Application Priority Data

Oct. 25, 2011 (JP) .................................. 2011-233915

(51) Int. Cl.
G02B 27/01 (2006.01)
G09B 29/00 (2006.01)
(Continued)

(52) U.S. Cl.
CPC ......... *G02B 27/017* (2013.01); *G09B 29/007* (2013.01); *G09B 29/10* (2013.01);
(Continued)

(58) Field of Classification Search
CPC ..... G02B 27/017; G02B 27/0172; G06F 1/16; G06F 3/002; G09G 5/00; G09G 2310/08
USPC .............................. 345/8, 156, 158, 629, 633
See application file for complete search history.

(56) References Cited

U.S. PATENT DOCUMENTS

2006/0018027 A1 1/2006 Yamasaki
2010/0013739 A1* 1/2010 Sako et al. ......................... 345/8
(Continued)

FOREIGN PATENT DOCUMENTS

JP H08-191419 A 7/1996
JP H10-341387 A 12/1998
(Continued)

OTHER PUBLICATIONS

Japanese Office Action dated Jan. 19, 2016 from related Japanese Patent Application No. 2011-233915, together with an English language translation.

*Primary Examiner* — Fred Tzeng
(74) *Attorney, Agent, or Firm* — Scully, Scott, Murphy & Presser, P.C.

(57) ABSTRACT

A head mounted display (HMD) apparatus including a head posture information sensor for sensing a value of a head posture information and a display for displaying an image in a display area. An information terminal (IT) including an IT-side sensor for sensing a value of an IT-side information. In a first control mode the IT transmits a first control mode information to the HMD apparatus, wherein the first control mode information is determined based on a received first value of the head posture information and the value of the IT-side information, and the HMD apparatus sets the image to be displayed based on the first control mode information. In a second control mode, the HMD apparatus sets the image to be displayed based on a second value of the head posture information. Methods and information storage devices storing programs for controlling the HMD apparatus and IT are also provided.

18 Claims, 10 Drawing Sheets

(51) Int. Cl.
*G09B 29/10* (2006.01)
*G06Q 30/02* (2012.01)

(52) U.S. Cl.
CPC .............. *G02B 2027/014* (2013.01); *G02B 2027/0178* (2013.01); *G02B 2027/0187* (2013.01); *G06Q 30/0259* (2013.01); *G06Q 30/0261* (2013.01)

(56) References Cited

U.S. PATENT DOCUMENTS

| | | | |
|---|---|---|---|
| 2012/0242560 A1* | 9/2012 | Nakada et al. | 345/8 |
| 2012/0327116 A1* | 12/2012 | Liu et al. | 345/633 |
| 2013/0063580 A1* | 3/2013 | Ogawa et al. | 348/65 |
| 2013/0257904 A1* | 10/2013 | Roth | 345/629 |
| 2014/0085203 A1* | 3/2014 | Kobayashi | 345/158 |
| 2014/0104143 A1* | 4/2014 | Benson et al. | 345/8 |
| 2014/0268360 A1* | 9/2014 | Ellsworth | 359/632 |
| 2014/0300532 A1* | 10/2014 | Karkkainen et al. | 345/156 |
| 2014/0375679 A1* | 12/2014 | Margolis et al. | 345/633 |
| 2014/0375680 A1* | 12/2014 | Ackerman et al. | 345/633 |
| 2015/0007114 A1* | 1/2015 | Poulos et al. | 715/852 |
| 2015/0084840 A1* | 3/2015 | Kim et al. | 345/8 |
| 2015/0091781 A1* | 4/2015 | Yu et al. | 345/8 |
| 2015/0109186 A1* | 4/2015 | Layson, Jr. | 345/8 |

FOREIGN PATENT DOCUMENTS

| | | | |
|---|---|---|---|
| JP | 2000-029617 A | 1/2000 | |
| JP | 2006-033617 A | 2/2006 | |
| JP | 2008-078758 A | 4/2008 | |

\* cited by examiner

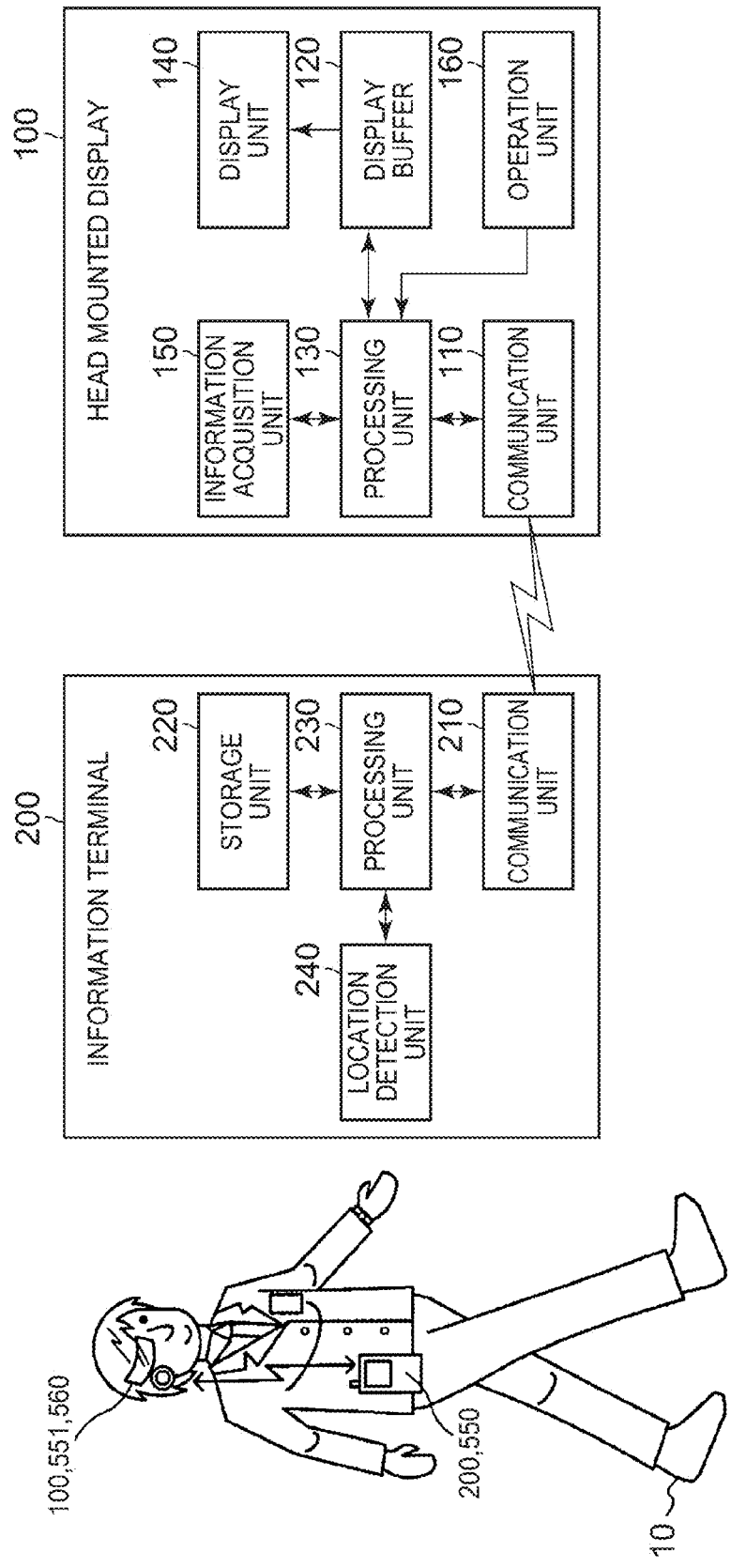

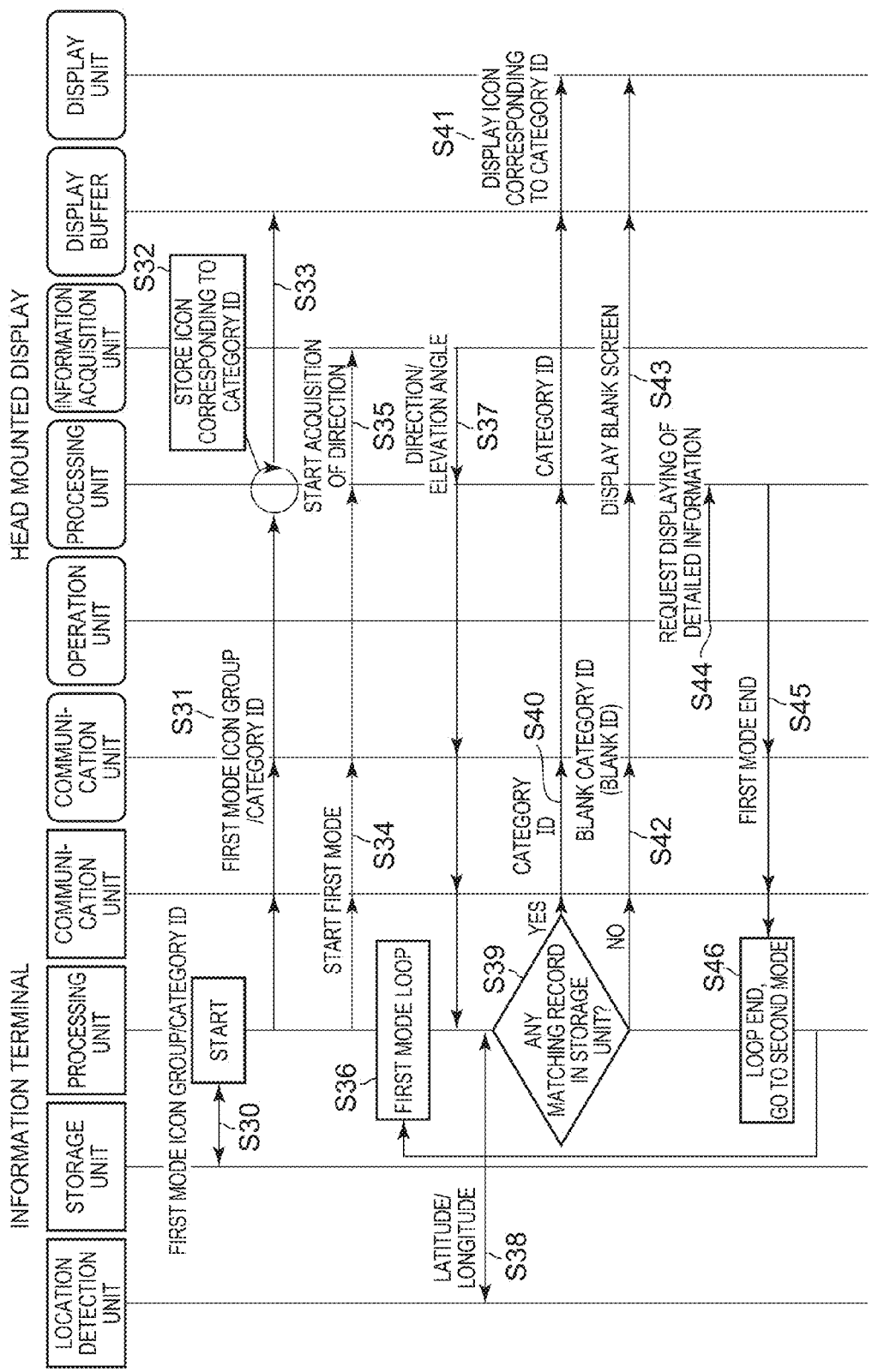

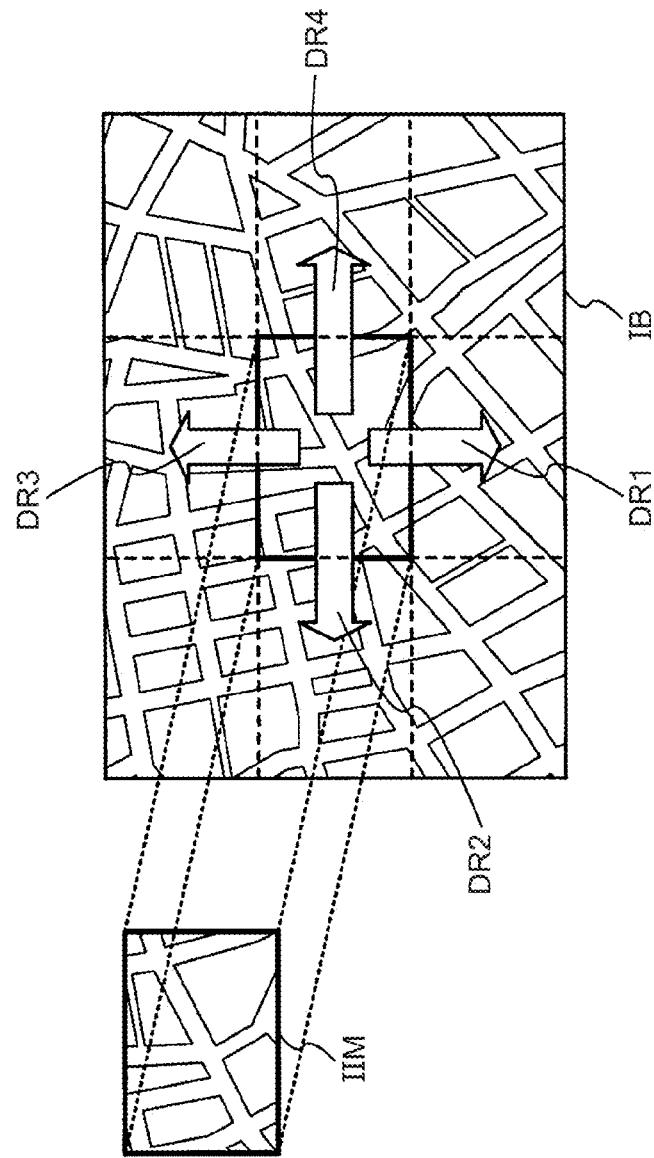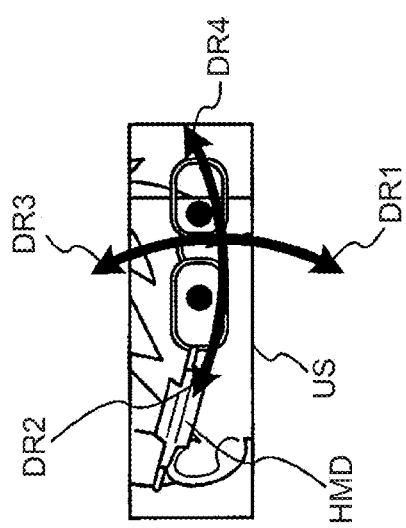

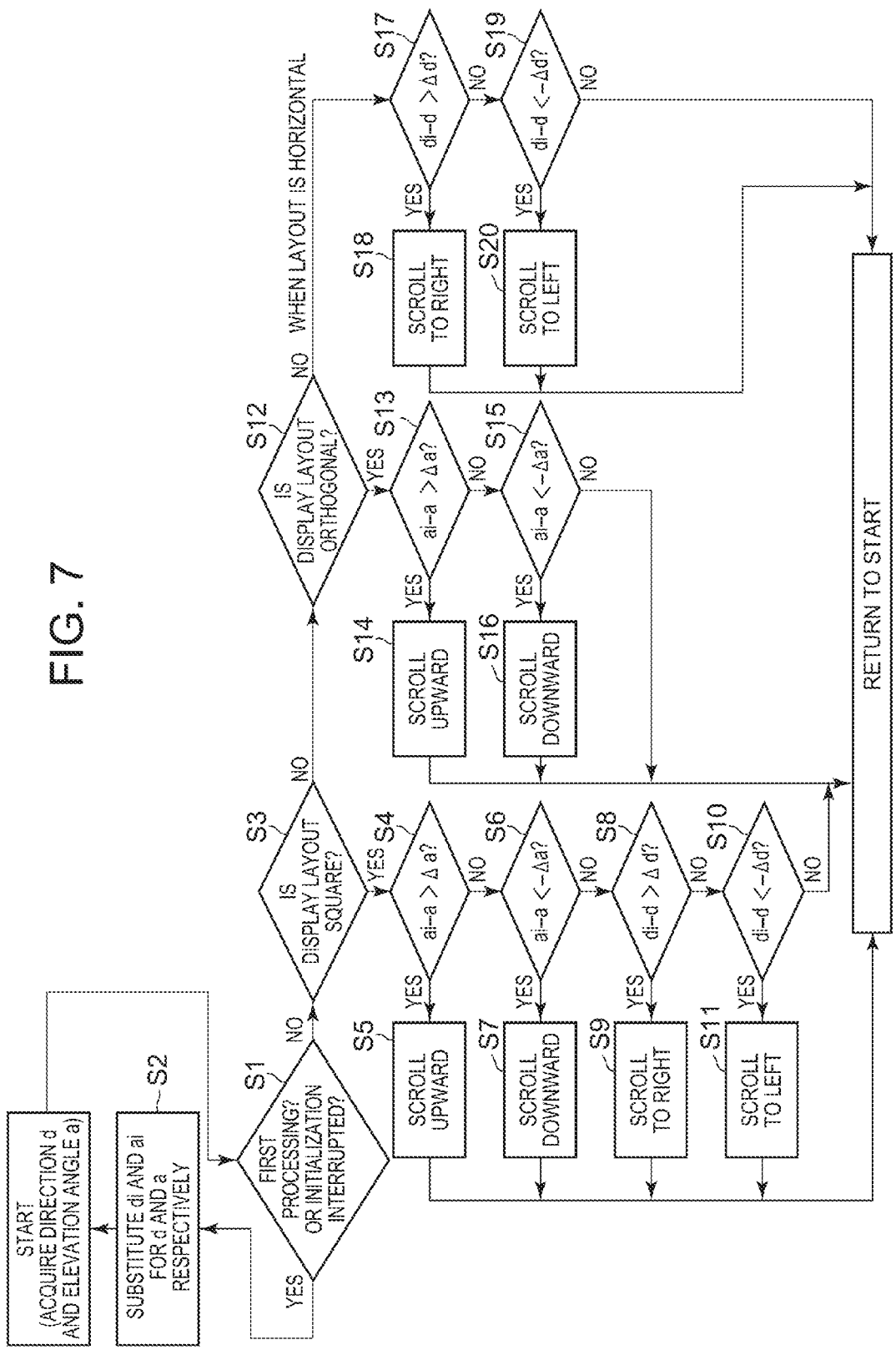

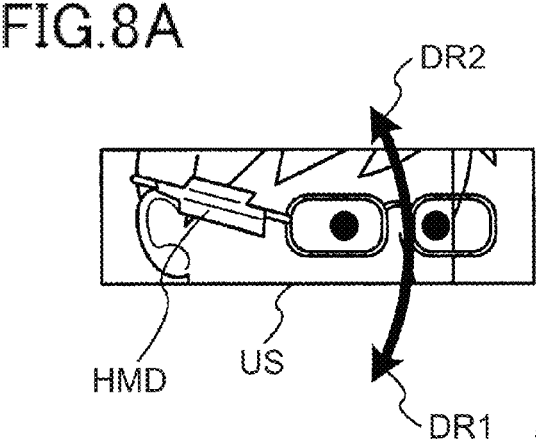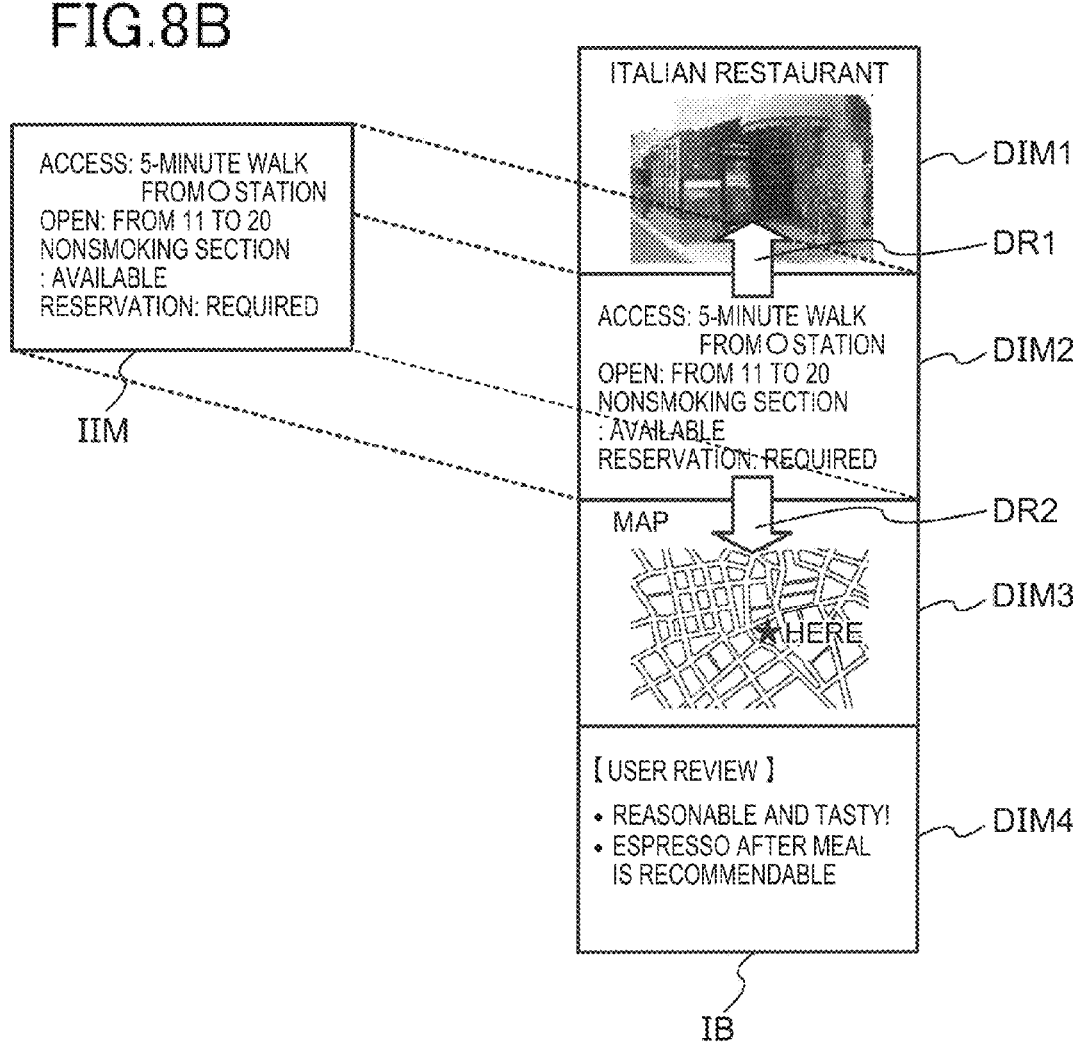

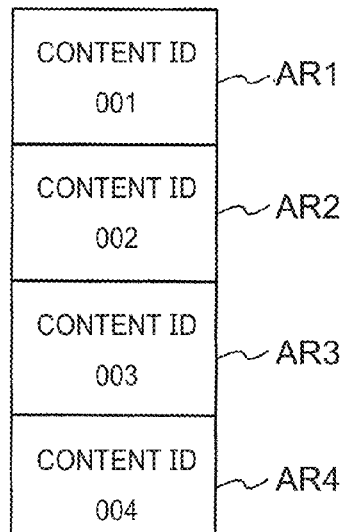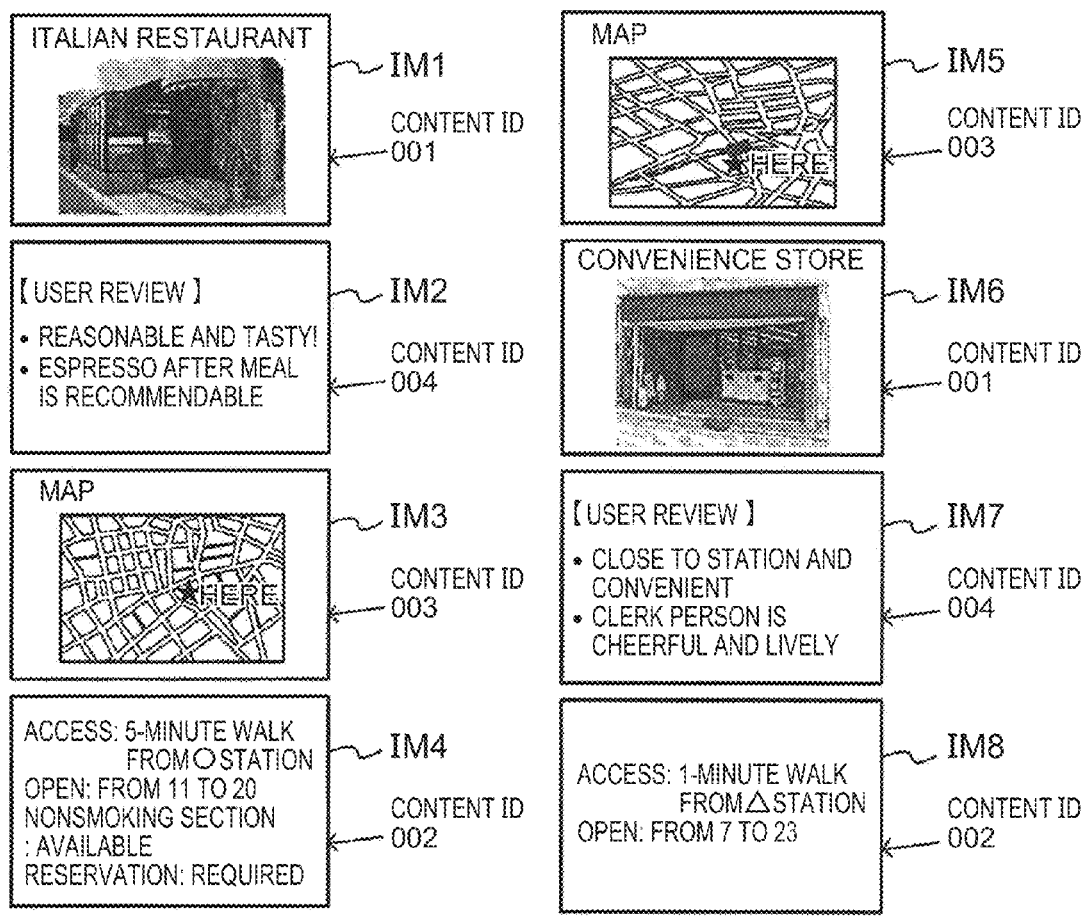

| CATEGORY ID | NAME | ICON FILE NAME |
|---|---|---|
| 0 | TOILET | toilet.jpg |
| 1 | POST OFFICE | postoffice.jpg |
| 2 | RESTAURANT | restaurant.jpg |
| 3 | STATION | station.jpg |
| ... | ... | ... |

| LATITUDE | LONGITUDE | DIRECTION | ELEVATION ANGLE | CATEGORY ID |
|---|---|---|---|---|
| 35.7247413801 | 139.3673466525 | 124 | 127 | 1 |
| 35.7247113801 | 132.3673466525 | 200 | 200 | 0 |
| 36.2347413801 | 132.3673466525 | 0 | 200 | 3 |
| ... | ... | ... | ... | ... |

| LATITUDE | LONGITUDE | DIRECTION | ELEVATION ANGLE | DETAILED INFORMATION IMAGE FILE NAME |
|---|---|---|---|---|
| 35.7247413801 | 139.3673466525 | 124 | 127 | r0.jpg, r0_info.jpg, comments.jpg... |
| 35.7247113801 | 132.3673466525 | 200 | 200 | t0.jpg, t0_location.jpg... |
| 36.2347413801 | 132.3673466525 | 0 | 200 | s0.jpg, s0_location.jpg... |
| ... | ... | ... | ... | ... |

HEAD MOUNTED DISPLAY APPARATUS, INFORMATION TERMINAL, AND METHODS AND INFORMATION STORAGE DEVICES FOR CONTROLLING HEAD MOUNTED DISPLAY APPARATUS AND INFORMATION TERMINAL

CROSS-REFERENCE TO RELATED APPLICATIONS

This application is a continuation of PCT International Application No. PCT/JP2012/077283, filed on Oct. 23, 2013, which claims the benefit of priority from Japanese Patent Application No. JP 2011-233915, filed on Oct. 25, 2011. The contents of PCT International Application No. PCT/JP2012/077283 and Japanese Patent Application No. JP 2011-233915 are incorporated herein by reference.

BACKGROUND

The present invention relates to a head mounted display, an information terminal, an information storage device, an image processing system, a method for controlling a head mounted display, a method for controlling an information terminal and the like.

Recently services have been developed to provide town information and map information using mobile electronic devices such as mobile phones and personal digital assistants (PDAs). Specifically the services include a navigation service, a shop information providing service and the like. For instance, a service providing shop information acquires the current location of a user by means of a global positioning system (GPS) or the like and urges the user to input a place that is targeted for a search, and then displays the location of the facility such as a restaurant on the map displayed on the screen of the mobile electronic device.

However some users are not good at reading maps, and so an information providing service simply by displaying the facility location on the map leads to a problem of difficulty in understanding in some cases.

A typical information providing service has another problem of the user's viewpoint (the direction of eyes) moving up and down frequently during use. For instance, a user has to look down at the mobile electronic device held by the hand to refer to the screen for such an information providing service. When the user uses the device while moving (e.g., when the user actually moves to the facility being displayed while referring to the display screen), the user has to look at the mobile electronic device while checking the safety on the road, for example. This is very troublesome for users.

For the convenience of users, it is desirable that the direction of eyes of the user using the information providing service does not change, and so when the user is walking (herein a service for pedestrians is assumed), it is favorable for the user to look at the travelling direction. One of methods to provide information without changing the viewpoint of a user includes a method of using a head mounted display (HMD) as an image display device that the user wears on the head and superimposing a display screen on the field of view of the user. JP-A-H10-341387 discloses a method of controlling an image displayed at a HMD in response to the movement of the user's head.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One aspect of the present invention relates to a head mounted display apparatus comprising: a transmitter-receiver configured to transmit and receive communication with an information terminal; a head posture information sensor configured to sense a value of a head posture information of a head of a user; a display configured to display an image in a display area; and a processor configured to set the image to be displayed in the display area, wherein in a first control mode: the processor is configured to control the transmitter-receiver to transmit a first value of the head posture information to the information terminal, the processor is configured to control the transmitter-receiver to receive a first control mode information from the information terminal, wherein the first control mode information is determined based on at least the first value of the head posture information, and the processor is configured to set the image to be displayed in the display area based on the first control mode information, and wherein in a second control mode, the processor is configured to set the image to be displayed in the display area based on a second value of the head posture information.

Another aspect of the present invention relates to an information terminal comprising: a transmitter-receiver configured to transmit and receive communication with a head mounted display apparatus; an information terminal-side sensor configured to sense a value of an information terminal-side information related to the information terminal; and a processor configured, in a first control mode, to: control the transmitter-receiver to receive a first value of a head posture information of a head of a user sensed by the head mounted display apparatus, and control the transmitter-receiver to transmit a first control mode information to the head mounted display apparatus, wherein the first control mode information is determined based on the received first value of the head posture information and the value of the information terminal-side information sensed by the information terminal-side sensor.

Still another aspect of the present invention relates to a system comprising: a head mounted display (HMD) apparatus; and an information terminal (IT), wherein the HMD apparatus comprises: an HMD-side transmitter-receiver configured to transmit and receive communication with the IT; a head posture information sensor configured to sense a value of a head posture information of a head of a user; a display configured to display an image in a display area; and an HMD-side processor configured to set the image to be displayed in the display area, wherein the IT comprises: an IT-side transmitter-receiver configured to transmit and receive communication with the HMD apparatus; an IT-side sensor configured to sense a value of an IT-side information related to the IT; and an IT-side processor, wherein in a first control mode: the HMD-side processor is configured to control the HMD-side transmitter-receiver to transmit a first value of the head posture information to the IT, the IT-side processor is configured to control the IT-side transmitter-receiver to receive the first value of the head posture information, the IT-side processor is configured to control the IT-side transmitter-receiver to transmit a first control mode information to the HMD apparatus, wherein the first control mode information is determined based on the received first value of the head posture information and the value of the IT-side information sensed by the IT-side sensor, the HMD-side processor is configured to control the HMD-side transmitter-receiver to receive the first control mode information, and the HMD-side processor is configured to set the image to be displayed in the display area based on the first control mode information, and wherein in a second control mode, the HMD-side processor is configured to set the image to be displayed in the display area based on a second value of the head posture information.

BRIEF DESCRIPTION OF THE DRAWINGS

FIG. 1A and FIG. 1B show a system configuration of the present embodiment.

FIG. 3 is a sequence chart to describe the flow of processing to set a first mode.

FIGS. 6A to 6C show an exemplary display layout.

FIG. 7 is a flowchart to describe an example where a display area is moved in accordance with a posture variation.

FIGS. 8A to 8C show exemplary displayed images to represent detailed information.

FIG. 9A and FIG. 9B show an example where an image is arranged in accordance with a content ID.

FIGS. 10A to 10C show exemplary databases.

DETAILED DESCRIPTION

Figure 2A:
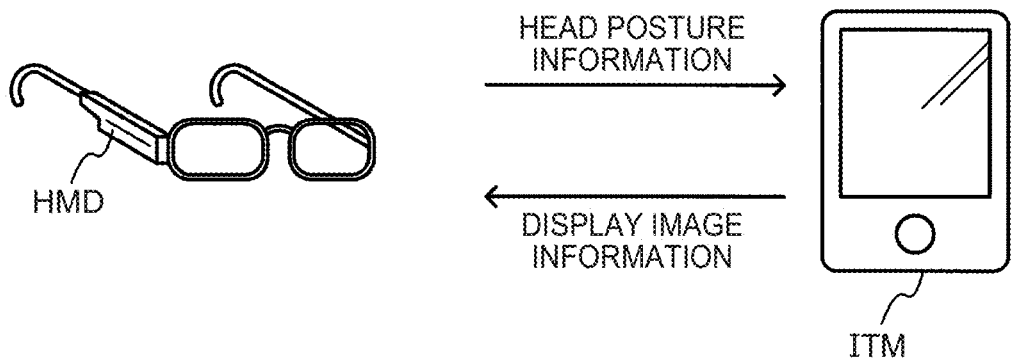
FIG. 2A and FIG. 2B describe control modes.

Some embodiments of the present invention can provide a head mounted display, an information terminal, an information storage device storing a program for controlling a head mounted display, an information storage device storing a program for controlling an information terminal, an image processing system, a method for controlling a head mounted display, a method for controlling an information terminal and the like, which are capable of performing the procedure to specify an image to be displayed in the head mounted display in accordance with a set control mode.

Some embodiments of the present invention can provide a head mounted display, an information terminal, an information storage device storing a program, an image processing system, a method for controlling a head mounted display, a method for controlling an information terminal and the like, which are capable of performing the procedure to specify an image to be displayed in the head mounted display in accordance with a set control mode, thus suppressing power consumption of the system as a whole and satisfying real time requirements.

One aspect of the present invention relates to a head mounted display including: a communication unit that performs a communication with an information terminal; a display buffer that stores image data received from the information terminal via the communication unit at an image storage area; an information acquisition unit that acquires head posture information; a processor that sets a display area at the image storage area of the display buffer; and a display that displays an image at the set display area as a display image. When a control mode is set at a first mode, the communication unit transmits the head posture information to the information terminal, and when the control mode is set at a second mode, the communication unit does not transmit the head posture information to the information terminal, and the processor sets the display area at the image storage area of the display buffer on a basis of the head posture information.

This configuration enables procedure to specify an image to be displayed in the head mounted display to be performed in accordance with a set control mode.

In this aspect of the present invention, the communication unit may receive display layout data and the image data from the information terminal when the control mode is set at the second mode, the display buffer may store the image data at the image storage area set by the display layout data, and the processor may set the display area at the image storage area on a basis of the head posture information.

This configuration allows, when the control mode is set at the second mode, image data to be stored in the display buffer and an image to be displayed at the display of the head mounted display in the display layout indicated by the display layout data received from the information terminal.

This configuration further allows, for example, the display layout at the display buffer to be changed in accordance with display layout data received from the information terminal.

In this aspect of the present invention, the processor may set a first display area at the image storage area when the head posture information represents a first head posture, and may set a second display area at the image storage area when the head posture information represents a second head posture, and the display may display an image at the first display area as the display image when the first display area is set, and may display an image at the second display area as the display image when the second display area is set.

This configuration allows, for example, a display area to be set at a different area on the image storage area in accordance with the head posture information, for example. That is, the display area can be scrolled, for example, on the image storage area in response to the vertical and horizontal movement of the user's head.

In this aspect of the present invention, the processor may find a posture variation on a basis of the acquired head posture information, and when it is determined that the posture variation is a predetermined threshold or more, the processor may move the display area from the first display area to the second display area.

This configuration enables, for example, by comparison between the posture variation and a predetermined threshold to determine as to whether or not to move the display area.

In this aspect of the present invention, when the control mode is set at the second mode, the communication unit may transmit the head posture information to the information terminal and receive a plurality of pieces of image data corresponding to the transmitted head posture information and positional information from the information terminal, and the display buffer may store the plurality of pieces of image data at the image storage area set by the display layout data.

This configuration allows, for example, a plurality of images representing a facility or the like to be stored at the image storage area of the display buffer of the head mounted display and allows the head mounted display to change a display image in accordance with the user's head posture without performing a communication with the information terminal.

In this aspect of the present invention, the communication unit may receive the image data and a content ID associated with the image data, and the display buffer may store the image data associated with each content ID at each area of the image storage area corresponding to the content ID.

This configuration allows, by assigning the same content ID to images representing the same type of content, the same type of image data to be stored at the same position of the image storage area, for example.

Another aspect of the present invention relates to an information terminal including: a communication unit that performs a communication with a head mounted display; a storage unit that stores image data; a processor that performs setting processing of a control mode; and a location detection unit that detects positional information. The storage unit stores information of a first database including a category ID associated with the image data and information of a second database including combination of head posture information received from the head mounted display and the positional information, which is associated with the category ID, the communication unit transmits the information of the first database to the head mounted display, the processor acquires the category ID associated with combination of the head posture information and the positional information from the second database when the control mode is set at the first mode, and the communication unit transmits the acquired category ID to the head mounted display.

This configuration allows the processor of the head mounted display to specify image data corresponding to the acquired category ID based on the first database and to set, as a display area, an area that stores the specified image data in the image storage area of the display buffer, for example.

In the other aspect of the present invention, when the control mode is set at the first mode and combination of the head posture information and the positional information does not exist in the second database, the communication unit may transmit a blank ID as the category ID to the head mounted display.

This configuration allows the processor of the head mounted display acquiring a blank ID not to set a display area at the image storage area, for example.

In the other aspect of the present invention, the storage unit may store a third database including combination of the head posture information and the positional information, which is associated with a plurality of pieces of image data, the processor may acquire the plurality of pieces of image data associated with combination of the head posture information and the positional information from the third database when the control mode is set at the second mode, and the communication unit may transmit the acquired plurality of pieces of image data to the head mounted display.

This configuration allows the display buffer of the head mounted display to store a plurality of pieces of image data at the image storage area set by the display layout data, for example.

In the other aspect of the present invention, the processor may switch the control mode from the first mode to the second mode or from the second mode to the first mode on a basis of user input information received from the head mounted display via the communication unit.

This configuration allows a user who intends to refer to detailed information on a facility or the like to change the control mode into the second mode by input by the user or a user who intends to refer to the outline information of nearby facilities because the user restarts to move to change the control mode into the first mode by input by the user.

Still another aspect of the present invention relates to an information storage device that is a computer readable information storage device storing a program that makes a computer function as the aforementioned units.

A further aspect of the present invention relates to an image processing system including: a head mounted display that acquires head posture information, sets a display area at an image storage area to store image data and displays an image of the set display area; and an information terminal that performs detection processing of positional information and setting processing of a control mode and performs a communication with the head mounted display. The information terminal stores information of a first database including a category ID associated with image data and information of a second database including combination of the head posture information and the positional information, which is associated with the category ID and transmits the information of the first database to the head mounted display. When the information terminal sets the control mode at a first mode, the head mounted display transmits the head posture information to the information terminal, the information terminal acquires the category ID associated with combination of the received head posture information and the positional information from the second database, and transmits the acquired category ID to the head mounted display, and the head mounted display specifies the image data associated with the received category ID from the first database, and sets, as the display area, an area where the specified image data is stored in the image storage area. When the information terminal sets the control mode at a second mode, the head mounted display does not transmit the head posture information to the information terminal, and sets the display area at the image storage area on a basis of the head posture information.

A still further aspect of the present invention relates to a method for controlling a head mounted display including the steps of: receiving image data from an information terminal; storing the received image data at an image storage area of a display buffer; acquiring head posture information of a user; setting a display area at the image storage area of the display buffer; displaying an image of the set display area as a display image; when a control mode is set at a first mode, transmitting the head posture information to the information terminal; and when the control mode is set at a second mode, not transmitting the head posture information to the information terminal, and setting the display area at the image storage area of the display buffer on a basis of the head posture information.

Another aspect of the present invention relates to a method for controlling an information terminal including the steps of: receiving head posture information of a user from a head mounted display; detecting positional information on the user; storing image data, and storing information of a first database including a category ID associated with the image data and information of a second database including combination of the head posture information and the positional information, which is associated with the category ID; transmitting the information of the first database to the head mounted display; performing setting processing of a control mode; when the control mode is set at a first mode, acquiring the category ID associated with combination of the received head posture information and the detected positional information from the second database; and transmitting the acquired category ID to the head mounted display.

The following describes the present embodiment. Firstly a summary of the present embodiment is described, and next an exemplary system configuration of the present embodiment is described. Then, the details of the processing of the present embodiment are described referring to a sequence chart and a specific example, and finally a method of the present embodiment is described. Note here that the present embodiment described below is not intended to unreasonably limit the content of the present invention recited in the claims. The entire configuration described in the present embodiment is not always the essential components of the present invention.

1. Summary

Recently services have been developed to provide town information and map information using mobile electronic devices such as mobile phones and personal digital assistants (PDAs). Specifically the services include a navigation service, a shop information providing service and the like. For instance, a service providing shop information acquires the current location of a user by means of a GPS or the like and urges the user to input a search targeted location, and then displays the location of the facility such as a restaurant on the map displayed on the screen of the mobile electronic device.

However some users are not good at reading maps, and so an information providing service simply by displaying the facility location on the map leads to a problem of difficulty in understanding in some cases.

A typical information providing service has another problem of the user's viewpoint (the direction of eyes) moving up and down frequently during use. For instance, a user has to look down at the mobile electronic device held by the hand to refer to the screen for such an information providing service. When the user uses the device while moving (e.g., when the user actually moves to the facility being displayed while referring to the display screen), the user has to look at the mobile electronic device while checking the safety on the road, for example. This is very troublesome for users.

For the convenience of users, it is desirable that the direction of eyes of the user using the information providing service does not change, and so when the user is walking (herein a service for pedestrians is assumed), it is favorable for the user to look at the travelling direction. One of methods to provide information without changing the viewpoint of a user includes a method of using a head mounted display (HMD) as an image display device that the user wears on the head and superimposing a display screen on the field of view of the user. Patent Document 1 discloses a method of controlling an image displayed at a HMD in response to the movement of the user's head.

One available method is to provide an information providing service using a HMD alone without keeping a communication state with an information terminal. In this case, however, since there is an upper limit of the data amount that a display buffer and a storage unit of the HMD can store, an area to provide an information providing service is limited or detailed information on shops or the like cannot be provided to users unfortunately.

On the other hand, an information providing service using both of an information terminal and a HMD while keeping a communication state between the information terminal and the HMD has the following problems.

Firstly since there is a need to always exchange sensor data wirelessly between the HMD and the information terminal, the power consumption increases.

Secondly a system implementing the aforementioned information providing service is configured so that an information terminal receiving sensor data from a HMD transmits a display control signal to the HMD. That is, a bilateral communication is required between the HMD and the information terminal. This may impair the real time when the screen is scrolled in response to the movement of the head.

A HMD, an information terminal and the like of the present embodiment for performing a processing to specify an image to be displayed on the HMD in accordance with a set control mode are contemplated.

2. Exemplary System Configuration

FIG. 1A shows a state where a user 10 uses a head mounted display (HMD) and an information terminal of the present embodiment. In FIG. 1A, the user 10 wears a HMD 100 on the head, and has an information terminal 200. The user further wears various sensors as wearable sensors. Specifically the HMD 100 is equipped with an acceleration sensor 551 and a direction sensor 560, and the information terminal 200 is equipped with a GPS sensor 550.

The GPS sensor 550 is a sensor to detect the location (place) of the user. Instead of the GPS sensor 550, a location information service of a mobile phone or location information of a nearby wireless LAN may be used.

The direction sensor 560 is a geomagnetic sensor, for example, and measures the direction where the direction sensor faces by the angle (0° to 360°). The geomagnetic sensor is made up of a device having a resistance value or an impedance value that changes with the magnitude of the magnetic field, for example, and detects triaxial geomagnetic information.

The acceleration sensor 551 is made up of a device having a resistance value that changes with an external force, for example, and detects triaxial acceleration information.

A sensor having all of the functions of the geomagnetic sensor, the acceleration sensor and a gyro sensor may be used. Further, a sensor configured to calculate a variation angle with reference to the magnetic north based on geomagnetic information and acceleration information may be provided.

Next FIG. 1B shows an exemplary configuration of the HMD and the information terminal of the present invention and an image processing system including the HMD and the information terminal.

The HMD 100 includes a communication unit 110, a display buffer 120, a processing unit (processor) 130, a display unit (display) 140, an information acquisition unit 150 and an operation unit 160.

The information terminal 200 includes a communication unit 210, a storage unit 220, a processing unit (processor) 230 and a location detection unit 240. The information terminal 200 may be a mobile information terminal (mobile computer) such as a PDA or a laptop PC. The information terminal 200 may be a device that doubles as a mobile phone, a wristwatch, a portable audio device or the like.

The HMD 100 and the image processing system of the present embodiment are not limited to the configuration of FIG. 1B, and various modifications may be made thereto, such as omission of a part of the elements and addition of other elements. A part of the functions of the image processing system of the present embodiment is implemented by the information terminal 200, which may be implemented by an electronic device different from the information terminal 200, for example. For instance, a part of the functions of the image processing system may be implemented by one or more servers (including computing hardware) connected to the information terminal 200 or the HMD 100 via a communication.

The following describes connections of the units. The communication unit 110 of the HMD and the communication unit 210 of the information terminal exchange information in accordance with a communication standard such as Wifi or Bluetooth (registered trademark). The communication unit 110 and the communication unit 210 may perform a communication by wire or wirelessly. The functions of each of the communication unit 110 and the communication unit 210 can be implemented by a transmitter-receiver or a transceiver, for example.

The communication unit 110 of the HMD is then connected to the processing unit 130. The processing unit 130 is connected to the display buffer 120, the information acquisition unit 150 and the operation unit 160. The display buffer 120 is connected to the display unit 140. The information acquisition unit 150 is connected to the processing unit 130.

The communication unit 210 of the information terminal is then connected to the processing unit 230. The processing unit 230 is connected to the communication unit 210, the storage unit 220 and the location detection unit 240. The storage unit 220 is connected to the processing unit 230. The location detection unit 240 is connected to the processing unit 230.

Next the following describes processing performed by each unit.

The display buffer 120 has an image storage area capable of storing an image having twice or more resolution of the resolution that the display unit 140 can display. The image storage area of the display buffer 120 can be implemented by a memory such as a RAM, a hard disk drive (HDD) or the like.

The processing unit 130 controls various units of the HMD. Specifically the processing unit 130 performs setting processing of a display area described later or instructs the information acquisition unit to start or stop acquisition of sensor information in accordance with user input information.

The display unit 140 displays an image stored in the image storage area of the display buffer 120. The display unit 140, for example, is mounted in the vicinity of the user's head so that the size thereof becomes smaller than the size of the user's pupil, and functions as a display unit of a so-called see-through viewer.

The information acquisition unit 150 acquires sensor information and informs the processing unit 130 of the sensor information. The information acquisition unit 150 may be a sensor itself or a function unit to acquire sensor information from a sensor.

The operation unit 160 acquires input information from a user and informs the processing unit 130 of the information. The operation unit 160 may be a button, a switch or the like provided at the HMD 100, for example. The operation unit 160 may be provided at the information terminal 200.

The storage unit 220 stores an image to be displayed at the display unit 140 of the HMD or a database, and serves as a working area of the processing unit 230 or the like, and the function thereof may be implemented by a memory such as a RAM, a HDD or the like.

The processing unit 230 controls various units of the information terminal. The processing unit 230 further performs setting processing of control modes.

The functions of the processing unit 130 and the processing unit 230 may be implemented by hardware such as various processors (e.g., CPU) or an ASIC (e.g., gate array) or a combination of a program and processors or ASIC.

The location detection unit 240 acquires location information on a user and informs the processing unit 230 of the information. The location detection unit 240 may be a sensor itself such as the GPS sensor 550 or the like or a function unit to acquire sensor information from a sensor.

3. Detailed Processing 3.1 Outline of Control Modes

Figure 2B:
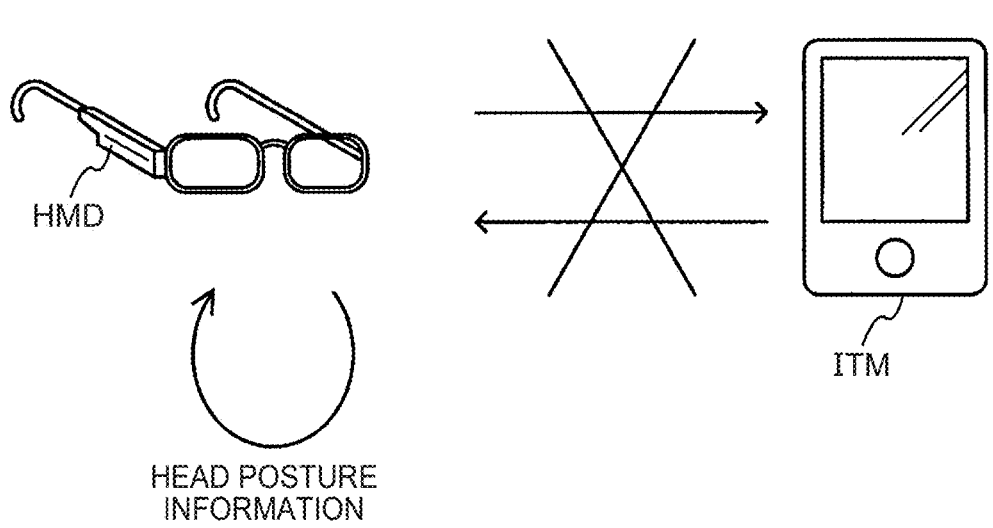

To begin with, the outline of control modes is described, with reference to FIGS. 2A and 2B. The control modes in the present embodiment include two types of a first mode and a second mode.

FIG. 2A shows the state of processing when the control mode is set at the first mode. In this case, the HMD 100 transmits head posture information and the like to the information terminal 200, and the information terminal 200 specifies display image information based on the head posture information received. Then the information terminal 200 transmits the specified display image information to the HMD 100. That is, the HMD 100 and the information terminal 200 specify an image to be displayed while performing a communication mutually. Herein, the display image information may be an image to be displayed itself or information indicating a specific image as in the present embodiment. This is described later.

FIG. 2B shows the state of processing when the control mode is set at the second mode. In this case, the HMD 100 and the information terminal 200 perform a communication mutually at the starting time of the processing and subsequently disconnect the communication. Then, the HMD 100 alone specifies an image to be displayed on the basis of head posture information.

The following describes specific processing for the first mode and the second mode.

3.2 Detailed Processing for the First Mode

Figure 4A:
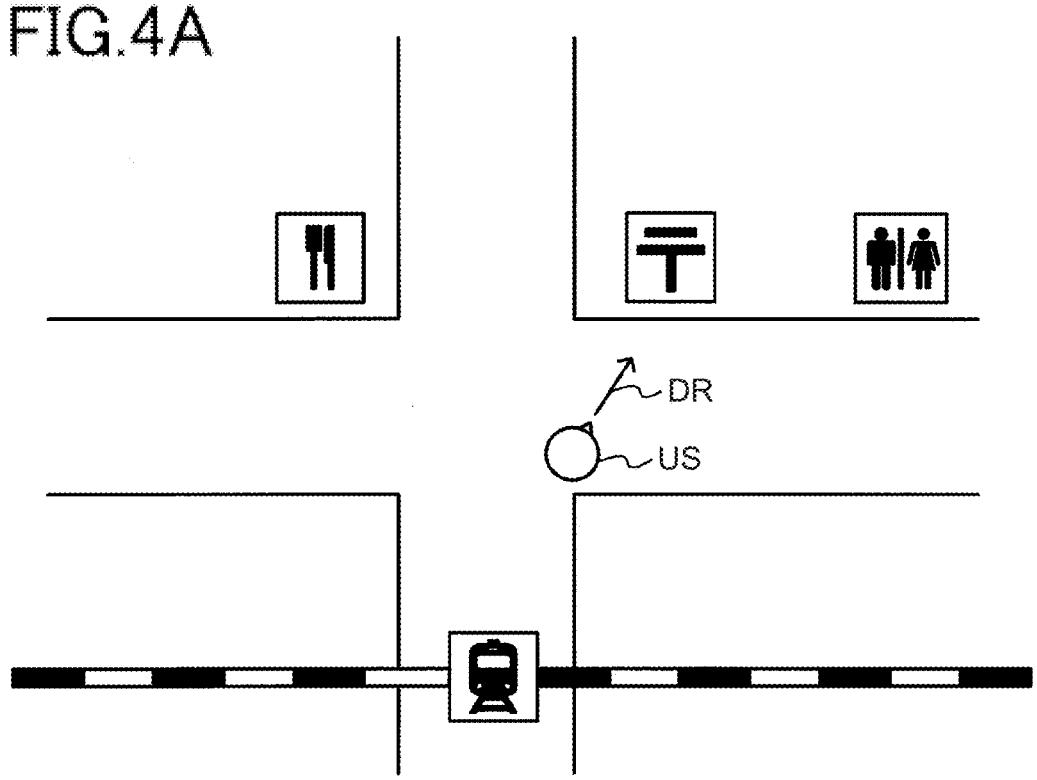
FIGS. 4A to 4C show exemplary display of icon images.
Figures 4B, 4C:
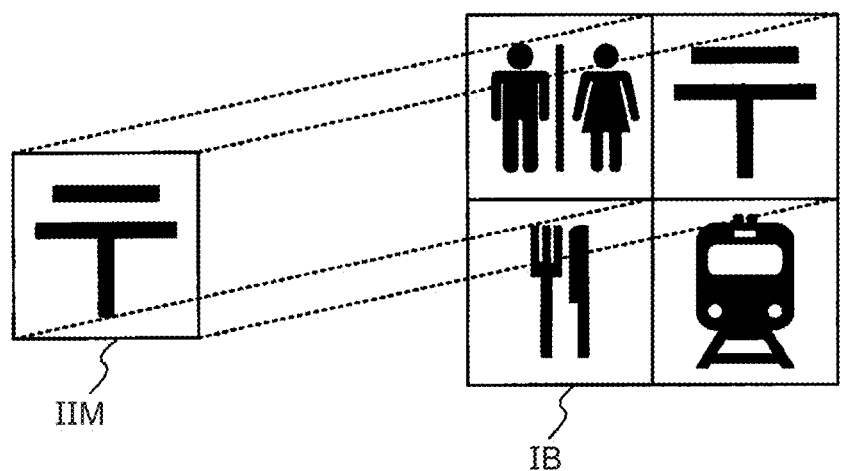

Referring to the sequence chart of FIG. 3, the following describes detailed processing when the first mode is set. FIG. 4A shows a state of using the image processing system of the present embodiment. FIG. 4B shows an exemplary icon image to be displayed at the HMD 100 and FIG. 4C shows an exemplary image storage area of the display buffer 120 of the HMD 100 when the control mode is set at the first mode in FIG. 4A.

In the example shown in FIG. 4A, the head of a user 10 is directed in the DR direction, and there is a post office ahead of the head direction DR. There are a railroad crossing, a restaurant, a toilet and the like as well around the user 10. In such a case, it is assumed that the user 10 uses the HMD 100 and the information terminal 200 of the present embodiment to start to use an information providing service.

Then, the processing unit 230 of the information terminal 200 reads an icon image (image data or an icon image group for first mode) and a category ID associated with the icon image from the storage unit 220 (S30).

Specific examples of the icon image include an image IIM in FIG. 4B, images stored in an image storage area IB in FIG. 4C and the like.

Specific examples of data associating icon images with category IDs include a first database DB1 shown in FIG. 10A. The first database DB1 of FIG. 10A includes each type of facilities such as a toilet, a post office, a restaurant and a station associated with its specific category ID. Then, the first database DB1 associates the category IDs with file names of the icon images, so that the designation of a category ID leads to the specification of the corresponding icon image. For instance, when the category ID is designated as 2, then an icon image indicated by the icon file (restaurant.jpg) relating to "restaurants" is specified.

Next, the processing unit 230 of the information terminal 200 transmits these icon image and category ID (hereinafter called the first database DB1) to the processing unit 130 of the HMD 100 via the communication units 110, 210 (S31). Then, the processing unit 130 of the HMD 100 receives the first database DB1 and stores the same (S32). The information terminal 200 of the present embodiment transmits the entire first database DB1 by Step S32. Alternatively, the information terminal 200 may transmit a part of the first database DB1 only, or the HMD 100 may store the first database DB1 beforehand.

When such a series of processing ends, the processing unit 230 of the information terminal 200 transmits a start instruction of loop processing for first mode to the processing unit 130 of the HMD 100 (S34) to start the loop processing for first mode (S36).

The processing unit 130 of the HMD 100 receiving the start instruction of the loop processing for first mode then issues an instruction to start acquisition of head posture information (direction) to the information acquisition unit 150 (S35), and acquires the head posture information such as a direction and an elevation angle related to user's head posture from the information acquisition unit 150 (S37). For instance, the direction information of the head posture information indicates the DR direction in FIG. 4A.

The processing unit 230 of the information terminal 200 acquires location information on the user 10 from the location detection unit 240 provided at the information terminal 200 while receiving the head posture information from the HMD 100 (S38). The location information represents the latitude and longitude of the current location of the user 10.

The storage unit 220 of the information terminal 200 stores a second database DB2 shown in FIG. 10B, for example, beforehand. As shown in FIG. 10B, the second database is a set of data (records) including combinations of location information (latitude and longitude in this case) and the head posture information (direction and elevation angle in this case) associated with category IDs.

Then the processing unit 230 of the information terminal 200 determines whether data (record) corresponding to the received head posture information and the acquired location information exists or not in the second database DB2 (S39), and when it is determined that the corresponding data exists, the processing unit 230 reads the category ID of the data and informs the processing unit 130 of the HMD 100 of the category ID (S40).

For instance, in the case of FIG. 4A, when the latitude and the longitude of the current location of the user 10 are 35.7247413801 and 139.367346525, respectively, the direction of the head posture of the user 10 is 124 and the elevation angle thereof is 127, the category ID can be specified as 0 based on the second database DB2 shown in FIG. 10B. Then, the information terminal 200 transmits the specified category ID=0 to the processing unit 130 of the HMD 100.

Meanwhile, the processing unit 130 of the HMD 100 specifies the icon image corresponding to the received category ID based on the first database DB1. Then, the processing unit 130 sets an area of the image storage area where the specified icon image is stored as a display area, and displays the icon image on the display unit 140 (S41).

For example, in the aforementioned example, when the processing unit 130 of the HMD 100 receives the category ID=0, the processing unit 130 searches for data (record) having the category ID=0 from the first database DB1 shown in FIG. 10A and specifies an icon file representing "post office" from the searched data. Then, the processing unit 130 sets the area in the image storage area IB shown in FIG. 4C where the specified icon file is stored as a display area, and displays the icon image IIM at the display unit as shown in FIG. 4B.

When the processing unit 230 of the information terminal 200 determines that no data exists corresponding to the combination the received head posture information and the acquired location information in the second database DB2, the processing unit 230 of the information terminal 200 informs the processing unit 130 of the HMD 100 of a blank ID (blank category ID) (S42). The blank ID may be any symbols and figures that are not associated with the icon files (icon images) in the first database DB1. For instance, in the example of FIG. 10A, "255" may be used for the blank ID, wherein "255" is not associated with any icon files.

Then, the processing unit 130 of the HMD 100 receiving the blank ID displays a blank image at the display unit 140 without setting a display area at the image storage area (S43). Alternatively the processing unit 130 of the HMD 100 does not display an image at the display unit 140.

Herein, when the user 10 makes a request for detailed information displaying via the operation unit 160 of the HMD 100 (S44), the processing unit 130 of the HMD 100 transmits a loop processing end request for first mode (or transition request to the second mode) to the processing unit 230 of the information terminal 200 (S45).

The processing unit 230 of the information terminal 200 receiving the loop processing end request for first mode ends the loop processing and sets the control mode at the second mode (S46).

3.3 Detailed Processing for Second Mode

Figure 5:
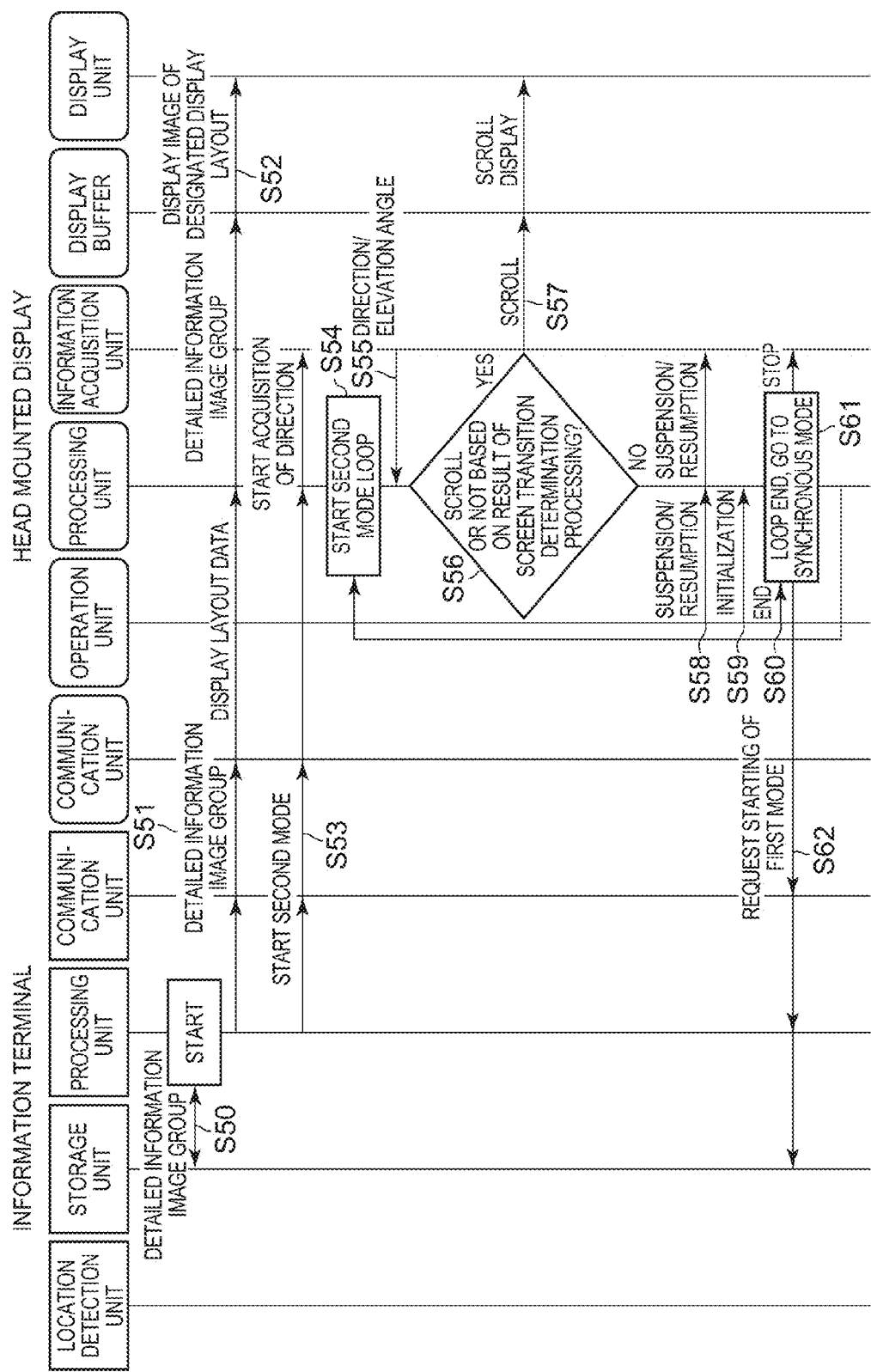
FIG. 5 is a sequence chart to describe the flow of processing to set a second mode.

Referring now to the sequence chart of FIG. 5, the following describes detailed processing to set the second mode.

It is assumed that the storage unit 220 of the information terminal 200 stores a third database DB3 shown in FIG. 10(C), for example, beforehand. As shown in FIG. 10(C), the third database DB3 is a set of data (records) including combinations of location information (latitude and longitude in this case) and head posture information (direction and elevation angle in this case) associated with a plurality of image file names (detailed information image files).

To begin with, the processing unit 230 of the information terminal 200 reads image data (detailed information image file) corresponding to the combination of the user's head posture information and location information immediately before the control mode is switched into the second mode from the third database DB3 (S50). A practical example of the detailed information image file is described later.

Next, the processing unit 230 of the information terminal 200 designates display layout data and transmits the display layout data with the image data (detailed information image file) to the HMD 100 (S51). Then, the processing unit 130 of the HMD 100 stores the received image data at the image storage area of the display layout indicated by the received display layout information. Then the processing unit 130 of the HMD 100 sets a display area at the image storage area, and the display unit 140 of the HMD 100 displays an image (S52).

Herein, the display layout data refers to data indicating a display layout as described later.

For instance, referring to FIGS. 6A to 6C, the following describes an example where the display layout data designates a rectangular display layout of 3 rows×3 columns. FIG. 6A shows the state where the user 10 wearing the HMD 100 shakes the head, FIG. 6B shows an exemplary image IIM to be displayed at the display unit 140 of the HMD 100 and FIG. 6C shows an image to be stored as the image storage area IB of the display buffer 120 of the HMD 100.

As stated above, the image storage area IB of the display buffer 120 has an area twice or more (in this example corresponding to nine screens) the image that the display unit can display, and the image data received from the information terminal 200 is stored in the image storage area IB set by the received display layout data (FIG. 6C). Then the display unit 140 displays a part of the stored image (IIM of FIG. 6B).

Alternatively, a horizontally-long rectangle of 1 row×9 columns or a vertically-long rectangle of 9 rows×1 column, for example, may be designated as the display layout. The display layout is not limited to the three examples of the display layout described above, and the image may be arranged on the display layout in any manner and the display buffer may be of any size.

Next, the processing unit 230 of the information terminal 200 transmits an instruction to start the processing of the second mode (S53), and the processing unit 130 of the HMD 100 starts the processing of the second mode (S54). Then, the information acquisition unit 150 of the HMD 100 transmits head posture information such as a direction and an elevation angle to the processing unit 130 of the HMD 100 (S55).

Then the processing unit 130 of the HMD 100 performs screen transition determination processing based on the acquired head posture information (S56). When the result of the screen transition determination processing shows that the displayed image is to be scrolled, the display unit scrolls the image for displaying (S57).

For instance, the following describes the case where, when the central image of FIG. 6C is the display image IIM as in FIG. 6B, the user 10 moves his or her head to the DR1 direction of FIG. 6A.

In this case, the central area of the image storage area IB is firstly set as the display area, and the image of the display area is displayed at the display unit 140 of the HMD 100. When the user 10 moves the head in the DR1 direction in this state, the display area is moved in the DR1 direction in the image storage area IB when the below-described screen transition condition holds. As a result, the image can be scrolled in the DR1 direction from the central image of the image storage area IB displayed at the display unit 140. The same applies for the case where the user 10 moves his or her head in the DR2 direction, the DR3 direction and the DR4 direction or another display layout is used.

Referring to the flowchart of FIG. 7, the following describes the screen transition determination processing in details.

In the present embodiment, sensor information that the information acquisition unit 150 of the HMD 100 acquires includes the direction d indicating the value of 0° to 360° and the elevation angle a indicating the value of 0° to 255°. Herein, the direction d at 0° or 360° shows the north periodic boundary condition, and the elevation angle a shows the right below at a=0°, horizontal at a=127° and the right above at a=255°. Let further that the initial direction is di, the initial elevation angle is ai, a threshold value to be compared with a difference between the initial direction di and the current direction d is Δd, and a threshold value to be compared with a difference between the initial elevation angle ai and the current elevation angle a is Δa.

Firstly the processing unit 130 of the HMD 100 determines whether the image transition determination processing this time is the processing for the first time or the processing for initialization interruption described later (S1).

When it is determined that the image transition determination processing is the processing for the first time or the processing for initialization interruption described later, the initial direction di and the initial elevation angle ai are substituted for the current direction d and the current elevation angle a, respectively (S2).

On the other hand, when it is determined that the image transition determination processing is not the processing for the first time or the processing for initialization interruption described later, determination is made whether the display layout is a square or not (S3). Herein, the square display layout refers to the display layout having the same number for rows and columns as in FIG. 6C.

When the display layout is determined as a square, and when it is determined that (ai−a)>Δa (S4), it is scrolled upward (S5). When it is not determined that (ai−a)>Δa but it is determined that (ai−a)<−Δa (S6), it is scrolled downward (S7).

Further when it is not determined that (ai−a)<−Δa and when it is determined that (di−d)>Δd (S8), it is scrolled to the right (S9), and when it is determined that (di−d)<−Δd (S10), it is scrolled to the left (S11). When it is not determined that (di−d)<−Δd, the screen transition determination processing ends.

On the other hand, when the display layout is not determined as a square, determination is made whether the display layout is orthogonal or not (S12). Herein an orthogonal display layout refers to the display layout including a plurality of rows and one column.

When the display layout is determined as orthogonal, and when it is determined that (ai−a)>Δa (S13), it is scrolled upward (S14). When it is determined as not (ai−a)>Δa but (ai−a)<−Δa (S15), it is scrolled downward (S16). When it is not determined as (ai−a)<−Δa, the screen transition determination processing ends.

Then, when the display layout is not determined as orthogonal, then the display layout is determined as horizontal. Herein a horizontal display layout refers to the display layout including one row and a plurality of columns.

When the display layout is determined as horizontal, and when it is determined that (di−d)>Δd (S17), it is scrolled to the right (S18). When it is determined as not (di−d)>Δd but (di−d)<−Δd (S19), it is scrolled to the left (S20). When it is not determined as (di−d)<−Δd, the screen transition determination processing ends.

In this way, the display area can be scrolled on the image storage area in response to the vertical and horizontal movement of the head.

In some cases, the user 10 may want to display a specific image continuously while moving his or her head, e.g., when the user 10 wants to compare the image indicating detailed information on the facility displayed at the display unit with the material at hand. When the aforementioned method is used, however, the display image will be changed in conjunction with the user's head posture.

Then, the present embodiment enables suspension of the display processing loop (S54 to S57) during the second mode setting and the information acquisition unit as well as the resumption in response to interruption by the operation unit (S58). For instance, when the display processing loop is suspended in the state of FIGS. 6A to 6C, the central image of the image storage area IB in FIG. 6C is displayed at the display unit 140 of the HMD 100, and even when the user turns the head toward the DR4 direction, the image displayed at the display unit 140 does not change (the same applies to the case in the DR1 to DR3 directions).

The aforementioned screen transition determination processing determines whether or not to scroll the screen based on the determination as to whether a difference between the stored direction and elevation angle at the starting time and subsequent directions and elevation angles exceeds a threshold value or not. Therefore such processing has a problem that, when the user 10 does not stand erect and the display processing loop is started from the state where the user's head is not horizontal and vertical with reference to the ground, the scroll cannot be performed in response to the head motion in some areas.

Then, the present embodiment performs interruption with respect to the display processing loop via the operation unit 160 of the HMD 100, and uses, as initial values, the direction and the elevation angle at the time when such interruption occurs (S59).

Then, the processing unit 130 of the HMD 100 continues the display processing loop for the second mode setting until the user 10 inputs an end request for the second mode (transition request for the first mode) via the operation unit 160. When the user 10 inputs an end request for the second mode (S60), the processing unit 130 of the HMD 100 ends the display processing loop (S61). Then, the processing unit 130 of the HMD 100 informs the information terminal 200 that the control mode is changed to the first mode (S62).

Referring next to FIGS. 8A to 8C, the following describes a practical example of the detailed information image.

To begin with, the detailed information image refers to an image representing information relating to individual facilities and the like. Specifically, a detailed information image relating to restaurants includes an image of a photo of the outside, an image representing access information, a map image, an image representing review information and the like, which are read from the third database DB3 as in FIG. 10(C) and stored in the image storage area IB of the display buffer 120 of the HMD 100 as shown in FIG. 8C.

Assume that the user 10 of FIG. 8A faces the front, for example, and detailed information image DIM2 (image representing access information) stored at the image storage area IB of FIG. 8C is the display image IIM. At this time, when the user US changes the head posture from the state of facing the front to the state of facing downward (DR1 direction) as stated above, the display area to be set on the image storage area of FIG. 8C also can be moved so that the area storing detailed information image DIM3 (map image) is set at the display area to display the map image DIM3.

When the display image is changed in response to shaking of the head by the user as in the aforementioned example, images indicating the same type of information preferably are stored at the same position of the image storage area of the display buffer.

For instance, images of photos of facilities and the like shot from the outside are stored at the first stage of the image storage area of the display buffer, images representing access information are stored at the second stage, map images are stored at the third stage and images representing review information are stored at the fourth stage. Thereby, for different targeted facilities of the detailed information image (e.g., restaurant A and restaurant B, or restaurant A and supermarket A) as well, a user easily knows the direction where the head is to be shaken so as to display the detailed information image that the user wants to refer to.

Then as shown in FIG. 9A, the display buffer of the present embodiment has an image storage area IB including areas AR1 to AR4, each of which is associated with a content ID. Further as shown in FIG. 9B, a different content ID is associated with each type of the detailed information image. For instance, a content ID=001 is associated with an image of a photo of facility and the like shot from the outside, a content ID=002 is associated with an image representing access information, a content ID=003 is associated with a map image and a content ID=004 is associated with an image representing review information. Then, each detailed information image is stored at the image storage area associated with the content ID of the detailed information image.

Thereby, among detailed information images shown in FIG. 9B, images IM1 and IM6 can be stored at the first image storage area AR1, images IM4 and IM8 can be stored at the first image storage area AR2, images IM3 and IM5 can be stored at the first image storage area AR3 and images IM2 and IM7 can be stored at the first image storage area AR4.

4. Method in the Present Embodiment 4.1 Head Mounted Display

The aforementioned head mounted display 100 of the present embodiment includes the communication unit 110 that performs a communication with the information terminal 200, the display buffer 120 that stores image data received from the information terminal 200 via the communication unit 110 in an image storage area, the information acquisition unit 150 that acquires head posture information, the processing unit 130 that provides a display area at the image storage area of the display buffer 120 and the display unit 140 that displays an image of the set display area as a display image. When the control mode is set at the first mode, the communication unit 110 transmits head posture information to the information terminal 200. When the control mode is set at the second mode, the communication unit 110 does not transmit head posture information to the information terminal 200, and the processing unit 130 sets a display area at the image storage area of the display buffer 120 based on the head posture information.

The display area refers to an area to be specified as an area to store an image to be displayed at the display unit 140. The display area is specified by an address of the image storage area.

The head posture information represents the user's head posture. The head posture information, for example, includes values of the elevation angle and the direction that are acquired from a sensor provided at the head of the user 10.

Herein the control mode refers to a mode to decide the content of a series of processing that the HMD 100 and the information terminal 200 perform, and the control mode in the present embodiment includes the first mode and the second mode. The control mode may include a mode other than the first mode and the second mode.

The first mode (synchronous mode) of the control mode refers to a mode where the HMD 100 and the information terminal 200 set a display area at an image storage area while performing a communication mutually, for example. FIG. 2A shows one example of the first mode.

On the other hand, the second mode (non-synchronous mode) refers to a mode where the HMD 100 and the information terminal 200 perform a communication mutually at the starting time of the processing, and subsequently the HMD 100 alone sets a display area at an image storage area based on the head posture information. FIG. 2B shows one example of the second mode.

Thereby, processing to specify an image to be displayed at the HMD 100 can be performed in accordance with the set control mode.

When the control mode is set at the second mode, the communication unit 110 may receive display layout data and image data from the information terminal 200. Then the display buffer 120 may store image data at an image storage area set by the display layout data, and the processing unit 130 may set a display area at the image storage area based on the head posture information.

Herein the display layout data refers to data indicating a display layout. The display layout refers to information indicating a positional relationship of images that are stored at the image storage area of the display buffer when the images are displayed at the display unit 140. The display layout may be ordering information of each area divided at the same resolution as that of the display unit 140 of the HMD 100. For instance, the display layout may be, but not limited thereto, a square (this may be a rectangle depending on the size of the image) of 3 rows×3 columns shown in FIG. 6C, a horizontally-long rectangle of 1 row×9 columns or a vertically-long rectangle of 9 rows×1 column, for example.

Thereby when the control mode is set at the second mode, image data can be stored at the display buffer 120 in the display layout indicated by the display layout data received from the information terminal 200, thus allowing an image to be displayed at the display unit 140 of the HMD 100.

The display layout of the display buffer 120 can be changed in accordance with the display layout data received from the information terminal 200.

Then, the head mounted display 100 can set a display area at the image storage area of the display buffer 120 in accordance with the head posture information of the user.

As compared with the method of transmitting head posture information to the information terminal 200 once and then specifying an image to be displayed at the display unit 140 by the information terminal 200 on the basis of the notified head posture information, the present technique can reduce a chance of communication between the HMD 100 and the information terminal 200, thus improving the response speed. That is, the HMD 100 can control display processing internally without a communication with the information terminal 200, whereby real time of the scrolling can be improved.

When the head posture represented by the head posture information is first head posture, the processing unit 130 may set a first display area at the image storage area, and when the head posture is second head posture, the processing unit 130 may set a second display area at the image storage area. Then, when the first display area is set, the display unit 140 may display an image of the first display area as the display image and when the second display area is set, the display unit 140 may display an image of the second display area as the display image.

Herein, the first display area and the second display area are mutually different areas in the image storage area. In the present example, the first display area and the second display area are preferably, but not limited thereto, adjacent to each other on the display layout. For instance, in the image storage area IB in FIG. 8B, the area to store the image DIM2 is the first display area and the area to store the image DIM1 is the second display area.

The first head posture refers to a head posture different from the second head posture. For instance, the state where the user US faces the front in FIG. 8A is the first head posture and the state where the user US faces downward (DR1 direction) is the second head posture.

Thereby a display area can be set at a different area on the image storage area in accordance with the head posture information, for example. That is, the display area can be scrolled, for example, on the image storage area in response to the vertical and horizontal movement of the user's head.

The processing unit 130 acquires a posture variation on the basis of the acquired head posture information, and when it is determined that the posture variation is a predetermined threshold or more, the processing unit 130 may move the display area from the first display area to the second display area.

Herein the posture variation is a difference between a reference head posture and the current head posture. The reference head posture may be the initial posture. For instance, this may be the initial direction d and the initial elevation angle a in FIG. 7.

Thereby, comparison between the posture variation and a predetermined threshold enables determination as to whether or not to move the display area, for example.

When the control mode is set at the second mode, the communication unit 110 may transmit head posture information to the information terminal 200, and may receive a plurality of pieces of image data corresponding to the transmitted head posture information and positional information from the information terminal 200. Then the display buffer 120 may store the plurality of pieces of image data at the image storage area set by the display layout data.

Herein, the positional information refers to information representing the location of the user, e.g., information such as the latitude and longitude of the current location of the user.

Thereby, a plurality of images representing a facility or the like, for example, can be stored at the image storage area of the display buffer 120 of the head mounted display, and the head mounted display can change a display image, for example, in accordance with the user's head posture without performing a communication with the information terminal.

When the user stops at a certain point to check the detailed information on a facility or the like, for example, there is no need to always perform a communication with the information terminal, and so power consumption or the like required for communication processing in such a case can be suppressed, for example.

The communication unit 110 may receive image data and a content ID associated with the image data. Then, the display buffer 120 may store the image data associated with each content ID at each area of the image storage area corresponding to the content ID.

Herein the content ID is a figure, a symbol or the like to identify types of information represented by the image. FIGS. 9A and 9B show specific examples thereof.

Thereby, the same content ID may be assigned to images representing the same type of content, whereby the same type of image data can be stored at the same position of the image storage area, for example. This means that, even when a plurality of pieces of image data received from the information terminal display different facilities, the user can easily know in which direction the user should turn the face.

4.2 Information Terminal

The information terminal 200 of the present embodiment includes the communication unit 210 that performs a communication with the head mounted display 100, the storage unit 220 that stores image data, the processing unit 230 that performs setting processing of a control mode and the location detection unit 240 that detects positional information. The storage unit 220 stores information of the first database DB1 including category IDs associated with image data and information of the second database DB2 including combination of the head posture information received from the head mounted display 100 with positional information, which is associated with category IDs. Then, the communication unit 210 transmits the information of the first database DB1 to the head mounted display 100. When the control mode is set at the first mode, the processing unit 230 acquires, from the second database DB2, a category ID associated with the combination of the head posture information and positional information. Then the communication unit 210 transmits the acquired category ID to the head mounted display 100.

Thereby, the processing unit 130 of the head mounted display 100 can specify image data corresponding to the acquired category ID based on the first database and can set, as a display area, an area that stores the specified image data in the image storage area of the display buffer 120.

Herein, the category ID is a figure or a symbol specific to facilities, where a category ID is assigned to each type of facilities such as toilets, post offices, restaurants and stations. They are those shown in FIG. 10A, for example.

The first database refers to a set (database) of data (records) including category IDs associated with image data information. The image data information associated with category IDs may be image data itself or information such as a file name of image data that can identify the image data. This may be DB1 shown in FIG. 10A, for example.

The second database is a set (database) of data (records) including each combination of positional information and head posture information associated with a category ID. This may be DB2 shown in FIG. 10B, for example.

This allows an image corresponding to the current location of the user 10 and the head posture to be displayed when the user 10 moves, for example. Since the head mounted display 100 simply may store such a first database DB1, the storage capacity of the head mounted display 100 does not pose a problem. Further, once the head mounted display 100 receives the first database DB1, head posture information and category IDs only may be exchanged between the head mounted display 100 and the information terminal 200, whereby communication cost also can be suppressed, and required real time can be easily satisfied.

When the control mode is set at the first mode and when the combination of the head posture information and positional information does not exist in the second database, the communication unit 210 may transmit a blank ID as the category ID to the head mounted display 100.

Herein the blank ID refers to a category ID to be used when no data corresponding to the combination of predetermined head posture information and predetermined positional information exits in the second database DB2. The blank ID may be any symbol or figure that is not associated with an icon file (icon image) in the first database. For instance, in the example of FIG. 10A, "255" is used as the blank ID.

This allows the processing unit 130 of the head mounted display 100 acquiring a blank ID not to set a display area at the image storage area, for example.

The storage unit 220 may store a third database DB3 including combination of head posture information and positional information associated with a plurality of pieces of image data. Then, when the control mode is set at the second mode, the processing unit 230 may acquire a plurality of pieces of image data associated with the combination of head posture information and positional information from the third database DB3. The communication unit 210 then may transmit the acquired plurality of pieces of image data to the head mounted display 100.

Herein the third database is a set (database) of data (records) including the combination of positional information and head posture information associated with a plurality of pieces of image data. The plurality of pieces of image data associated with category IDs may be image data itself or information such as a file name of image data that can identify the image data. This may be DB3 shown in FIG. 10C, for example. Items common to those in the aforementioned second database DB2 may be collected as one database.

This allows the display buffer 120 of the HMD 100 to store a plurality of pieces of image data at the image storage area set by the display layout data, for example. Then, the HMD 100 can change a display image in response to the user's head posture without performing a communication with the information terminal 200, for example.

The processing unit 230 further may switch the control mode from the first mode to the second mode or from the second mode to the first mode based on user input information received from the head mounted display 100 via the communication unit 210.

Herein the user input information is information that the user inputs via the operation unit 160.

This allows a user who intends to refer to detailed information on a facility or the like to change the control mode into the second mode by input by the user or a user who intends to refer to the outline information of nearby facilities because the user restarts to move to change the control mode into the first mode by input by the user.

The information terminal and the like of the present embodiment may be implemented by a processor such as a CPU executing a program, whereby a device which can estimate state of the user like as the present embodiment can be implemented. Specifically a program stored on an information storage device is read, and the read program is executed by the processor. Herein, the information storage device (a computer readable storage device) stores a program, data and the like therein, and the function thereof can be implemented by an optical disk (DVD, CD or the like), a HDD (hard disk drive) or a memory (card-type memory, ROM or the like), for example. Then the processor performs various processing of the present embodiment in accordance with the program (data) stored in the information storage device. That is, the information storage device stores a program (the program that lets a computer execute processing by each unit) to let a computer (a device equipped with an operation unit, a processing unit, a storage unit and an output unit) function through the processor as various units of the present embodiment. Based on the detailed description provided herein those skilled in the art would readily appreciate that many modifications are possible without materially departing from the novel teachings and advantages of the invention. Such modifications are therefore intended to be included within the scope of the invention. Any term described with a different term having a broader meaning or the same meaning at least once in the specification and the drawings can be replaced with the different term in any place in the specification and the drawings. The configurations and operations of the head mounted display, the information terminal, the program stored on the information storage device and the image processing system are not limited to those described in the present embodiment, and they may be variously implemented.

100 Head mounted display, 110 Communication unit, 120 Display buffer, 130 Processing unit (Processor), 140 Display unit (Display), 150 Information acquisition unit, 160 Operation unit, 200 Information terminal, 210 Communication unit, 220 Storage unit, 230 Processing unit (Processor), 240 Location detection unit, 550 GPS sensor, 551 Acceleration sensor, 560 Direction sensor

What is claimed is:

1. A head mounted display apparatus comprising:
   a transmitter-receiver configured to transmit and receive communication with an information terminal;
   a head posture information sensor configured to sense a value of a head posture information of a head of a user;
   a display configured to display an image in a display area; and
   a processor configured to set the image to be displayed in the display area,
   wherein in a first control mode:
   the processor is configured to control the transmitter-receiver to transmit a first value of the head posture information to the information terminal, the processor is configured to control the transmitter-receiver to receive a first control mode information from the information terminal, wherein the first control mode information is determined based on at least the first value of the head posture information, and a value of an information terminal-side information related to the information terminal, the processor is configured to set the image to be displayed in the display area based on the first control mode information, and wherein in a second control mode:

the processor is configured to control the transmitter-receiver to receive a screen transition information from the information terminal, the processor is configured to control the transmitter-receiver to disconnect the communication with the information terminal after receiving the screen transition information, and following disconnection of the communication, the processor is configured to set the image to be displayed in the display area based on the screen transition information and a second value of the head posture information.

2. The head mounted display apparatus according to claim 1, wherein the head posture information represents at least one of a direction and an elevation angle of the head of the user.

3. The head mounted display apparatus according to claim 1, wherein:

the information terminal-side information includes a location of the information terminal representing a location of the user, and the first control mode information includes a first data representing an association of the first value of the head posture information and the value of the information terminal-side information.

4. The head mounted display apparatus according to claim 1, wherein in the second control mode, the processor is configured to:

set a first image to be displayed in the display area based on the second value of the head posture information sensed by the head posture information sensor at a first time, and set a second image to be displayed in the display area based on the screen transition information and a third value of the head posture information sensed by the head posture information sensor at a second time, wherein the third value of the head posture information is different from the second value of the head posture information.

5. The head mounted display apparatus according to claim 4, wherein in the second control mode, the processor is configured to:

determine a difference between the second value of the head posture information and the third value of the head posture information, determine whether the difference is greater than a predetermined threshold, and set the second image to be displayed in the display area based on the screen transition information and a determination that the difference is greater than the predetermined threshold.

6. The head mounted display apparatus according to claim 5, wherein in the second control mode, the screen transition information associates at least:

a transition from the first image to be displayed in the display area to the second image to be displayed in the display area, and the predetermined threshold, and the processor is configured to set the second image to be displayed in the display area after the display of the first image in the display area based on:

the screen transition information, and the determination that the difference between the second value of the head posture information and the third value of the head posture information is greater than the predetermined threshold.

7. An information terminal comprising:

a transmitter-receiver configured to transmit and receive communication with a head mounted display apparatus;

an information terminal-side sensor configured to sense a value of an information terminal-side information related to the information terminal; and a processor configured, in a first control mode, to:

control the transmitter-receiver to receive a first value of a head posture information of a head of a user sensed by the head mounted display apparatus, and control the transmitter-receiver to transmit a first control mode information to the head mounted display apparatus, wherein the first control mode information is determined based on the first value of the head posture information and the value of the information terminal-side information sensed by the information terminal-side sensor, control the transmitter-receiver to transmit the first control mode information to the head mounted display apparatus, wherein the first control mode information is configured to be processed by the head mounted display apparatus to set an image to be displayed in a display area of the head mounted display apparatus; and in a second control mode, to:

control the transmitter-receiver to transmit a screen transition information to the head mounted display apparatus, wherein the screen transition information is configured to be processed with a second value of the head posture information of the head of the user sensed by the head mounted display apparatus to set the image to be displayed in the display area of the head mounted display apparatus, and control the transmitter-receiver to disconnect communication with the information terminal.

8. The information terminal according to claim 7, wherein the processor is configured, in the first control mode, to:

control the transmitter-receiver to transmit the first value of the head posture information sensed by the head mounted display apparatus and the value of the information terminal-side information sensed by the information terminal-side sensor to at least one server, and control the transmitter-receiver to receive the first control mode information from the at least one server, wherein the first control mode information is determined by the at least one server based on the first value of the head posture information and the value of the information terminal-side information sensed by the information terminal-side sensor.

9. The information terminal according to claim 7, wherein the head posture information represents at least one of a direction and an elevation angle of the head of the user.

10. The information terminal according to claim 9, wherein:
the information terminal-side information includes a location of the information terminal representing a location of the user, and
the first control mode information includes a first data representing an association of the first value of the head posture information and the value of the information terminal-side information.

11. The information terminal according to claim 7, wherein in the second control mode:
the screen transition information associates at least:
a transition from a first image to be displayed in the display area of the display of the head mounted display apparatus to a second image to be displayed in the display area, and
a predetermined threshold, and
the screen transition information is configured to be processed by the head mounted display apparatus to set the second image to be displayed in the display area after the display of the first image in the display area based on the screen transition information and a determination that a difference between a second value of the head posture information and a third value of the head posture information is greater than the predetermined threshold.

12. A system comprising:
a head mounted display (HMD) apparatus; and
an information terminal (IT),
wherein the HMD apparatus comprises:
an HMD-side transmitter-receiver configured to transmit and receive communication with the IT;
a head posture information sensor configured to sense a value of a head posture information of a head of a user;
a display configured to display an image in a display area; and
an HMD-side processor configured to set the image to be displayed in the display area,
wherein the IT comprises:
an IT-side transmitter-receiver configured to transmit and receive communication with the HMD apparatus;
an IT-side sensor configured to sense a value of an IT-side information related to the IT; and
an IT-side processor,
wherein in a first control mode:
the HMD-side processor is configured to control the HMD-side transmitter-receiver to transmit a first value of the head posture information to the IT,
the IT-side processor is configured to control the IT-side transmitter-receiver to receive the first value of the head posture information,
the IT-side processor is configured to control the IT-side transmitter-receiver to transmit a first control mode information to the HMD apparatus, wherein the first control mode information is determined based on the first value of the head posture information and the value of the IT-side information sensed by the IT-side sensor,
the HMD-side processor is configured to control the HMD-side transmitter-receiver to receive the first control mode information, and the HMD-side processor is configured to set the image to be displayed in the display area based on the first control mode information, and
wherein in a second control mode:
the IT-side processor is configured to control the IT-side transmitter-receiver to transmit a screen transition information to the HMD apparatus,
the HMD-side processor is configured to control the HMD-side transmitter-receiver to receive the screen transition information from the IT,
the IT-side processor and the HMD-side processor are configured to control the IT-side transmitter-receiver and the HMD-side transmitter-receiver respectively to disconnect communication, and
following the disconnection of the communication, the HMD-side processor is configured to set the image to be displayed in the display area based on the screen transition information and a second value of the head posture information.

13. The system according to claim 12, wherein the head posture information represents at least one of a direction and an elevation angle of the head of the user.

14. The system according to claim 12, wherein:
the IT-side information includes a location of the IT representing a location of the user, and
the first control mode information includes a first data representing an association of the first value of the head posture information and the value of the IT-side information.

15. The system according to claim 12, wherein in the second control mode, the HMD-side processor is configured to:
set a first image to be displayed in the display area based on the second value of the head posture information sensed by the head posture information sensor at a first time, and
set a second image to be displayed in the display area based on a third value of the head posture information sensed by the head posture information sensor at a second time and the screen transition information, wherein the third value of the head posture information is different from the second value of the head posture information.

16. The system according to claim 15, wherein in the second control mode, the HMD-side processor is configured to:
determine a difference between the second value of the head posture information and the third value of the head posture information,
determine whether the difference is greater than a predetermined threshold, and
set the second image to be displayed in the display area based on a determination that the difference is greater than the predetermined threshold.

17. The system according to claim 16, wherein in the second control mode:
the IT-side processor is configured to control the IT-side transmitter-receiver to transmit the screen transition information, wherein the screen transition information associates at least:
a transition from the first image to be displayed in the display area to the second image to be displayed in the display area, and
the predetermined threshold,
the HMD-side processor is configured to:
control the HMD-side transmitter-receiver to receive the screen transition information, and set the second image to be displayed in the display area after the display of the first image in the display area based on:
the screen transition information, and
the determination that the difference between the second value of the head posture information and the third value of the head posture information is greater than the predetermined threshold.

18. The system according to claim 12, wherein the IT-side processor is configured, in the first control mode, to:
control the IT-side transmitter-receiver to transmit the first value of the head posture information sensed by the head posture information sensor and the value of the IT-side information sensed by the IT-side sensor to at least one server, and
control the IT-side transmitter-receiver to receive the first control mode information from the at least one server, wherein the first control mode information is determined by the at least one server based on the first value of the head posture information and the value of the IT-side information.

* * * * *